United States Patent
Tremblay

(12) 
(10) Patent No.: US 6,212,699 B1
(45) Date of Patent: Apr. 10, 2001

(54) CABINET WATER SAVER

(76) Inventor: Gaston Tremblay, c/o Paul Biron, P.O. Box 0732, Jackman, ME (US) 04945-0732

(*) Notice: Subject to any disclaimer, the term of this patent is extended or adjusted under 35 U.S.C. 154(b) by 0 days.

(21) Appl. No.: 09/400,988

(22) Filed: Apr. 24, 1999

Related U.S. Application Data

(63) Continuation-in-part of application No. 08/886,291, filed on Jul. 1, 1997, now abandoned.

(51) Int. Cl.[7] ........................................................ E03D 1/00
(52) U.S. Cl. ...................................................... 4/415; 4/363
(58) Field of Search ................................. 4/363, 364, 415

(56) References Cited

U.S. PATENT DOCUMENTS

| | | | |
|---|---|---|---|
| 3,431,564 | * 3/1969 | Davies | 4/354 X |
| 4,121,308 | * 10/1978 | Raab | 4/415 |
| 4,143,430 | * 3/1979 | Joshi et al. | 4/364 X |
| 5,067,180 | * 11/1991 | Figeroid | 4/363 X |
| 5,148,555 | * 9/1992 | Doyle | 4/415 |

* cited by examiner

*Primary Examiner*—Charles E. Phillips

(57) ABSTRACT

A device for use in a water cabinet possessing a valve which stays open until the reservoir is empty. An auxiliary reservoir (20) without bottom is placed within the main reservoir. At the base (27) is a slit opening permitting liquid communication from the base of the main reservoir. At the top of the auxiliary little reservoir is located a check valve (24) controled by a lever arm (18) which at the same time acts as the flushing arm of the toilet cabinet; the check valve (24) closes as soon as is released the lever arm (18). When the little reservoir is full and its valve is closed, even when the main reservoir is being emptied the little reservoir remains full while the main reservoir evacuates, thereby economizing a quantity of water equivalent to its volume. The lower end of the auxiliary reservoir (20) may be cut for fitting in a given water cabinet reservoir.

3 Claims, 3 Drawing Sheets

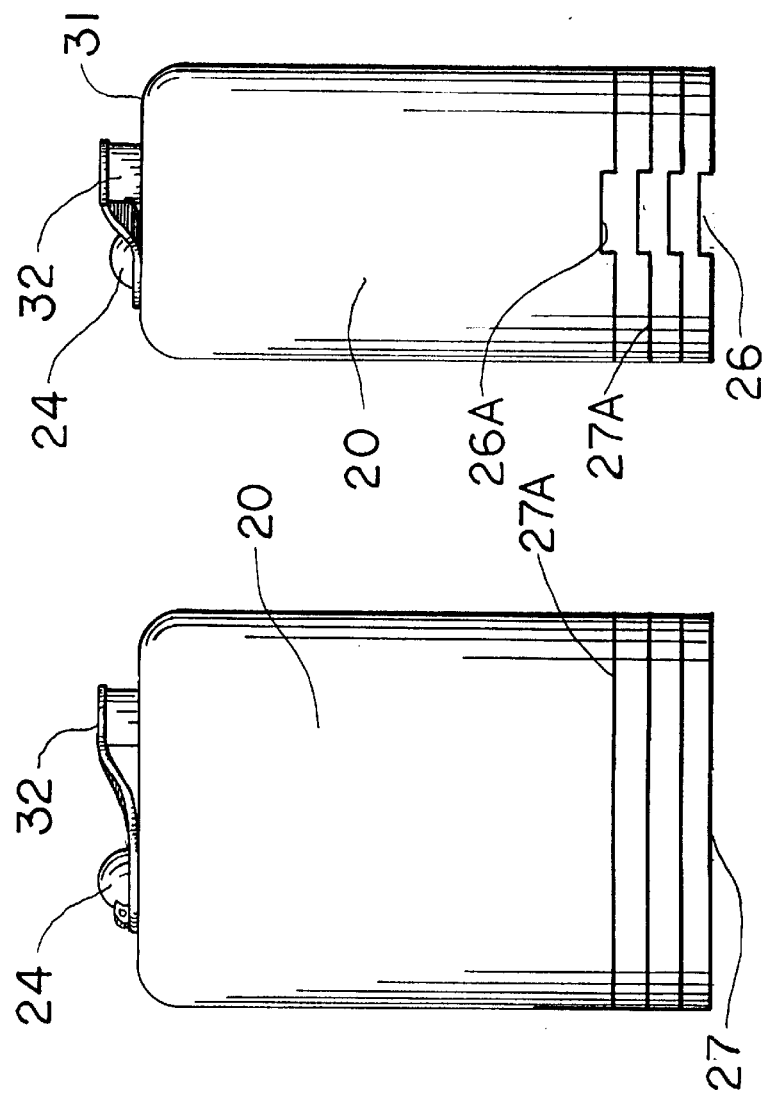
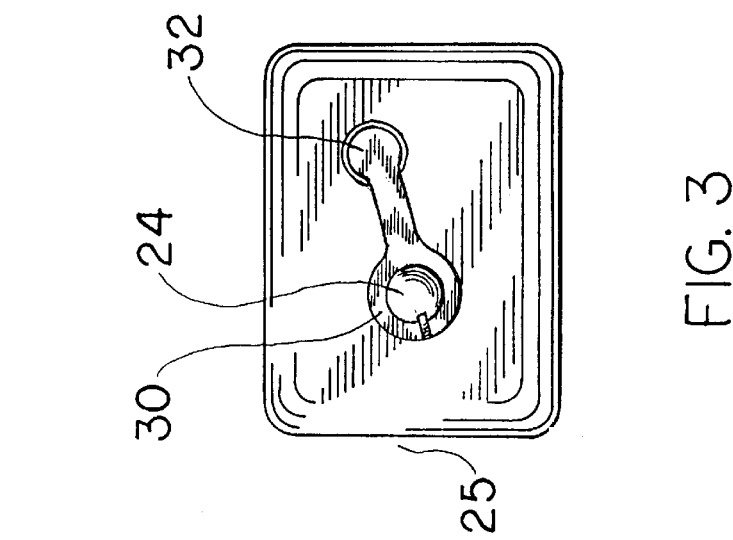
FIG. 5
FIG. 4
FIG. 3

CABINET WATER SAVER

This is a continuation-in-part of Ser. No. 08/886,291, filed Jul. 1, 1997, now abandoned.

BACKGROUND

1. Field of Invention

This invention belongs to the field of water economizer systems and more specifically for residential water-closets.

2. Description of the Prior Art

A review of the prior art has revealed the following patents:

CA 1,045,307, Raz, Feb. 2, 1979, an aspect of this invention was to transform a standard water closet into a water-closet permitting the utilization of a predetermined water quantity during the flushing operation. This system permits a relatively stable outflow of water during the flushing operation.

CA 2,099,199, Sweeny, Dec. 26, 1994, shows a second tank inside the principal tank of a water-closet. This second tank permits water economy according to the displacement of a partition wall.

U.S. Pat. No. 4,144,600, Mayes, Dec. 19, 1977, illustrates a new partition wall that is placed in a water-closet tank to limit the water quantity used during a water flush. The quantity of water used may be selected as a minimal quantity or as a maximal quantity by means of a selector that opens or closes a check-valve located on the new partition wall.

U.S. Pat. No. 4,219,895, Thompson, Nov. 30, 1978, shows a system wherein a partition wall is installed inside a water-closet tank to allow the use of a reduced quantity of water when flushing. A complex mechanism controls this system to permit the utilization of a greater water quantity for the greater needs.

U.S. Pat. No. 4,225,985, Joshi et al., Feb. 2, 1979, reveals a system which divides the principal water-closet tank into two distinct compartments by means of a partition wall of a closed container. A magnetic control permits a communicating opening between the two compartments. U.S. Pat. No. 4,388,737, Weenzel, Oct. 16, 1981, shows a system dividing a water-closet tank into three distinct compartments by partition walls. Direct or non-direct communication joins each compartment to control the quantity of liquid used during flushes.

U.S. Pat. No. 5,067,180, Figeroid, Nov. 26, 1991, illustrates a system comprising a tank within a principal water-closet tank. This tank is open on top and has an opening at its base permitting the liquid communication with the main tank of the water closet. A complex mechanism tied to the lever arm of the handle of the flush allows to open or obstruct the access to the opening located at the base of the tank. It is possible with this system to use a little or a big quantity of water, by depressing the handle of the flush more or less.

OBJECTS AND ADVANTAGES

The first objective of my device is to provide a water economizer for toilet to permit a supplementary water quantity for the greater evacuation needs of domestic wastes.

The device is to permit more specifically to adapt to the design of an existing water-closet, to allow quick and simple assembly, and also to permit an important and automatic drinking water economy.

Furthermore, another source of economy is to permit installation of the new economizer equipment on an existing toilet tank without any major modification. The unit is to be of simple conception, because the holding of the flush handle down for few more seconds permits the utilization of all the principal tank capacity when it's necessary.

BRIEF DESCRIPTION OF THE DRAWINGS

The present invention will be further understood from the following description with reference to the drawings in which:

FIG. 3 is a top view of the water economizer of FIG. 2.

FIG. 4 is a front view of the water economizer of FIG. 2.

FIG. 5 is a side view of the water economizer of FIG. 2.

DESCRIPTION OF A PREFERRED EMBODIMENT

Figure 1:
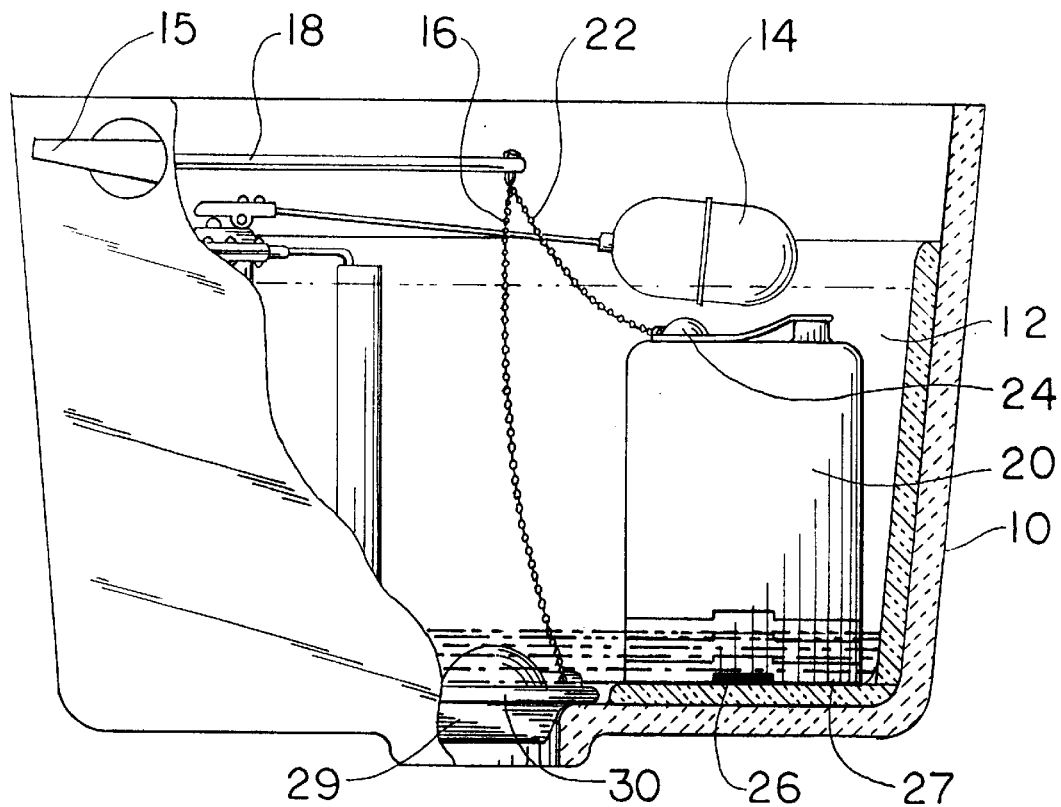
FIG. 1 is a front view of the water economizer installed.

A preferred embodiment of the invention is illustrated in FIG. 1 where the same characterizing elements are identified by the same numbers, and wherein is shown a watercloset 10 as is known in many households; a principal tank 12 is shown in cut view illustrating a classical mechanism and a secondary tank 20 in the right part of the main tank. The secondary tank 20 does not hinder the flushing mechanism; it is installed low enough to permit to a floater 14 to have a limited run while accomplishing its duties. One may remark that a secondary chain 22 added to an initial chain 16 relating a flushing lever arm 18 to a main check valve 30; the main check valve 30; is of a conventional floating type which once opened remains open as long as it is out of the water, floating on the water, and therefore until the complete evacuation of the main tank 12. The secondary chain 22 is relating this same lever arm 18 to a check valve 24 located on the roof of the secondary tank 20.

The check valve 24 must be pulled by the chain 22 to remain open; it closes automatically as soon as is released the chain 22, because it is heavy and of a non-floating type. When the secondary tank is being filled the raising of the water from the bottom of the secondary tank compresses the air in the tank and upwardly displaces the check valve 24. When filling the main tank 12, water enters the secondary tank 20 by a lower entrance 26 of the shape of a slot lower edge located at a 27 of the secondary tank 20. The pressure inside the secondary tank 20 is adjusted automatically by the check-valve 24 which raises under the pressure exerted by the air inside the secondary tank 20 when the water level increases inside.

During normal flushing, the user of the water-closet 10, after its use, lowers down the handle 15 of the flush for a short moment. This short moment permits to the main check-valve, located in a draining opening 29, to open. The check-valve 30 stays open to permit the complete evacuation of the water contained in the main tank 12, after which time the check valve closes automatically. The water contained in the secondary tank 20 does not flow out, for the check valve 24 situated on the roof 21 on the secondary tank 20 stays put. The air entrapped in the secondary tank 20 retains by suction the water contained in the secondary tank 20, stopping the water from lower opening 26. Once empty, the main tank 12 is filled normally.

When one needs a greater flush, the water closet 10 user lowers down the flushing handle 15 for a sufficient time to allow the two check valves 24 and the main plug 30 to open up and let evacuate the water contained in the main tank as well as in the secondary tank 20, the water contained in the secondary tank 20 running out into the main tank 12. Once empty, the main tank 12 as well as the secondary tank 20 fill at a normal rate.

Figure 2:
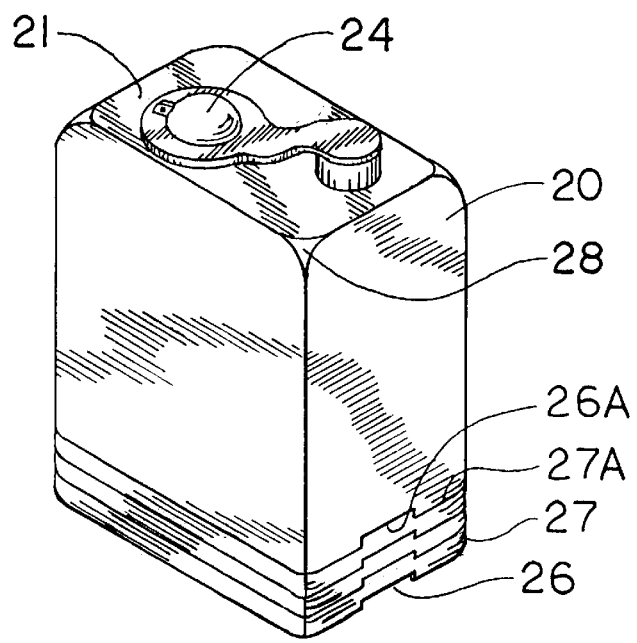
FIG. 2 is a perspective view of the water economizer of FIG. 1.
Figure 6:
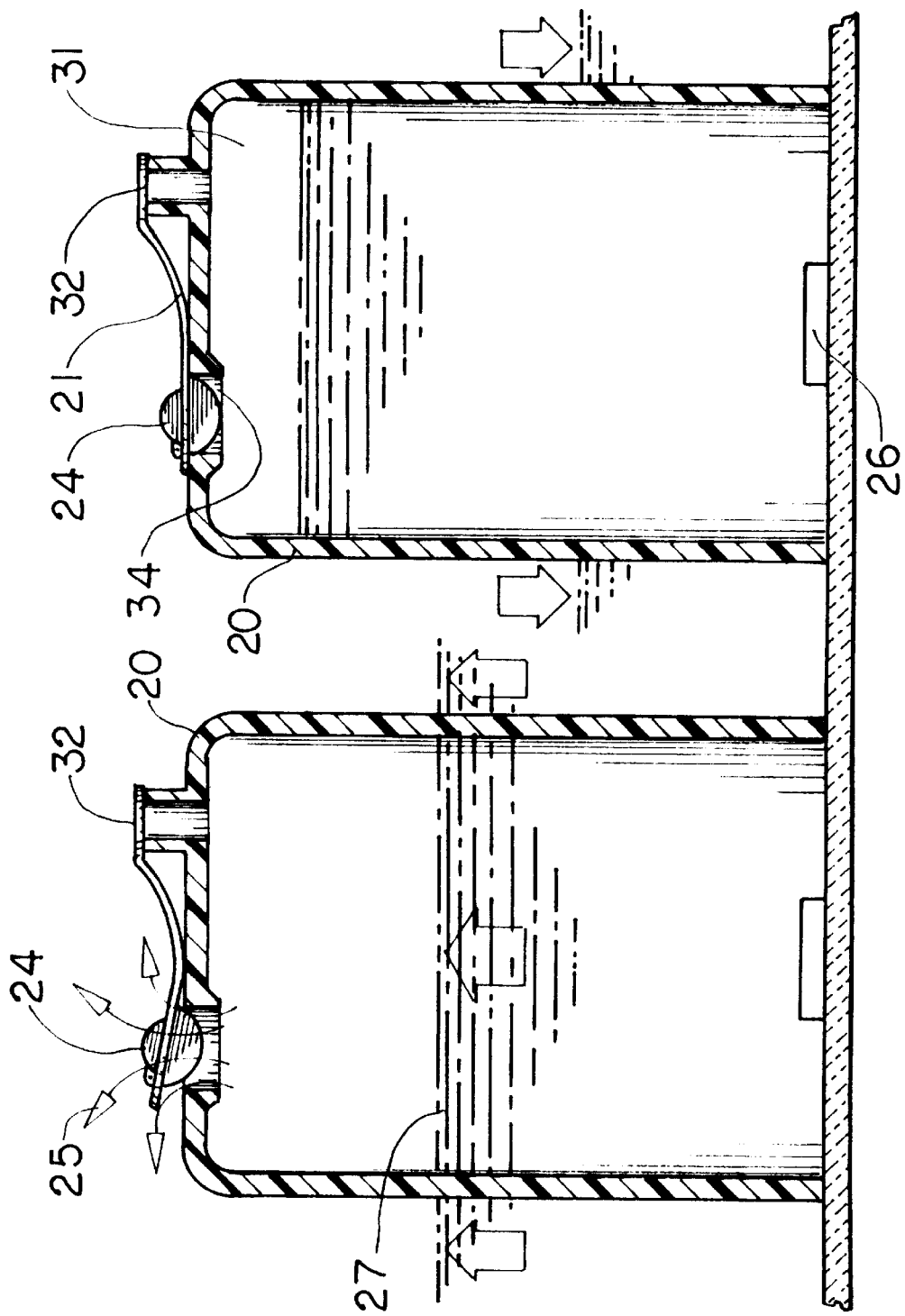
FIG. 6 is a diagram showing the functioning of the water economizer.

FIG. 2 allows a better view of the monobloc body 38 from the secondary tank 20 as well as the upper check valve 24. FIG. 5 permits to see in detail the lower opening 26, which might be on a different side. One may also remark the cylindrical swelling 32 located on the roof 31 of the secondary tank 20, just as the upper check valve 24 that allows a closing of its upper opening 34—FIG. 6—of the secondary tank, thus permitting always keeping air inside the cylindrical swelling 34 on top of the water surface of the secondary tank 20. It must be noted that the secondary tank 20 is without a bottom and comprises several cutting lines 26a, 27a parallel to lower edge 27 and to its lower opening 26, the latter being a slot made along the lower edge 27.

INSTALLATION

The described installation method agrees with the installation method of the water economizer in the majority of water closets.

1: Close the water inlet to the water closet 10.
2: Take out, if necessary, the float 14 as well as the lever arm 18 that will be found inside the water closet 10.
3: Cut the lower edge 27 of the secondary tank according to a cutting line 26a, 27a appropriate to the height of the main tank 12 in which it is to be installed.
4: Place the secondary tank 20 onto the base 27 in the part of the main tank 12 away from the handle 15.
5: Reinstall the lever arm 18 and the float 14.
6: Attach the secondary chain 22 at the end of the lever arm 18 while adjusting the length of the secondary chain 22 in order to open the superior check valve at the same time as the main plug 30 when one pulls at the maximum the handle 15.
7: Open the water closet 10 water inlet.
8: Verify the adjustment.

SUMMARY, RAMIFICATIONS AND SCOPE

An apparatus that serves to economize a water quantity while using a water closet, including a main tank having an upper opening, sides and a draining bottom, including a draining opening as well as a chain destined to activate the draining, the apparatus including in combination:

a secondary tank including
  a tight enclosure vertically disposed but without a lower part for the contents thereof to be in fluid communication with the draining bottom,
  an upper part forming a tight roof on top of the enclosure,
  a check valve 24 disposed on the upper part,
  means for activating a check valve and closing to let or not circulate the air at will inside the enclosure,
  when check valve means are open to let the air circulate, the lower part in fluid communication is allowing the filling of the secondary tank and when the check valve is closed and the secondary tank is full at least partially, the void created prevents the discharge of the secondary tank and is therefore saving the water volume contained in the secondary tank, while flushing.

The apparatus described wherein the tight enclosure constitutes the sides of a rectangular parallelepiped comprising a roof and four sides but no lower part, the rectangular parallelepiped being made in a waterproof material.

Other embodiments are possible and limited only by the scope of the appended claims.

I claim:

1. A device to economize a quantity of water when utilizing a water-closet (10) having a main tank (12) being open at the top, having sides and a bottom having a drain opening having a main plug (30) of the type that once opened remains open while it is in the water and closes upon complete emptying of said main tank (12), a lever arm (18) mounted on said tank and a first chain (16) attaching said lever arm (18) to said main plug (30) for opening of the latter, by traction of said first chain, said device comprising, in combination with said main tank (12), said lever arm (18), said main plug (30) and said first chain (16):

a secondary reservoir (20) resting on said bottom, said secondary reservoir having impermeable walls, an impermeable roof (21) and having a lower opening (26) for fluid communication with said main tank at the level of said bottom, said roof comprising an upper opening (34), a check valve (24) mounted on said upper opening (34), between a lower position closing said upper opening (34) and an elevated position clearing said upper opening, a second chain attaching said lever arm (18) to said check valve (24) to open said check valve (24) when said lever arm is actuated to open said main plug (30), said check valve (24) returning to said lower position, as soon as a traction exerted on said second chain is released.

2. The device of claim 1 wherein said walls of said secondary reservoir have a lower free edge resting directly on said bottom of said main reservoir, said lower free edge having a notch forming said lower opening (26).

3. The device of claim 2 wherein said walls of said secondary reservoir further comprise spaced lines of cutting parallel to and adjacent said lower free edge and depicting said notch to permit selectively decreasing the height of said reservoir by cutting said side walls along a selected one of said lines of cutting.

* * * * *